July 7, 1959    C. W. MERTZ ET AL    2,893,927
PROCESS CONTROL SYSTEM
Filed July 15, 1954    3 Sheets-Sheet 1

INVENTOR.
C. W. Mertz and
W. M. Zoller
BY
Hudson & Young
ATTORNEYS

INVENTOR.
C. W. Mertz and
W. M. Zoller
BY Hudson & Young
ATTORNEYS

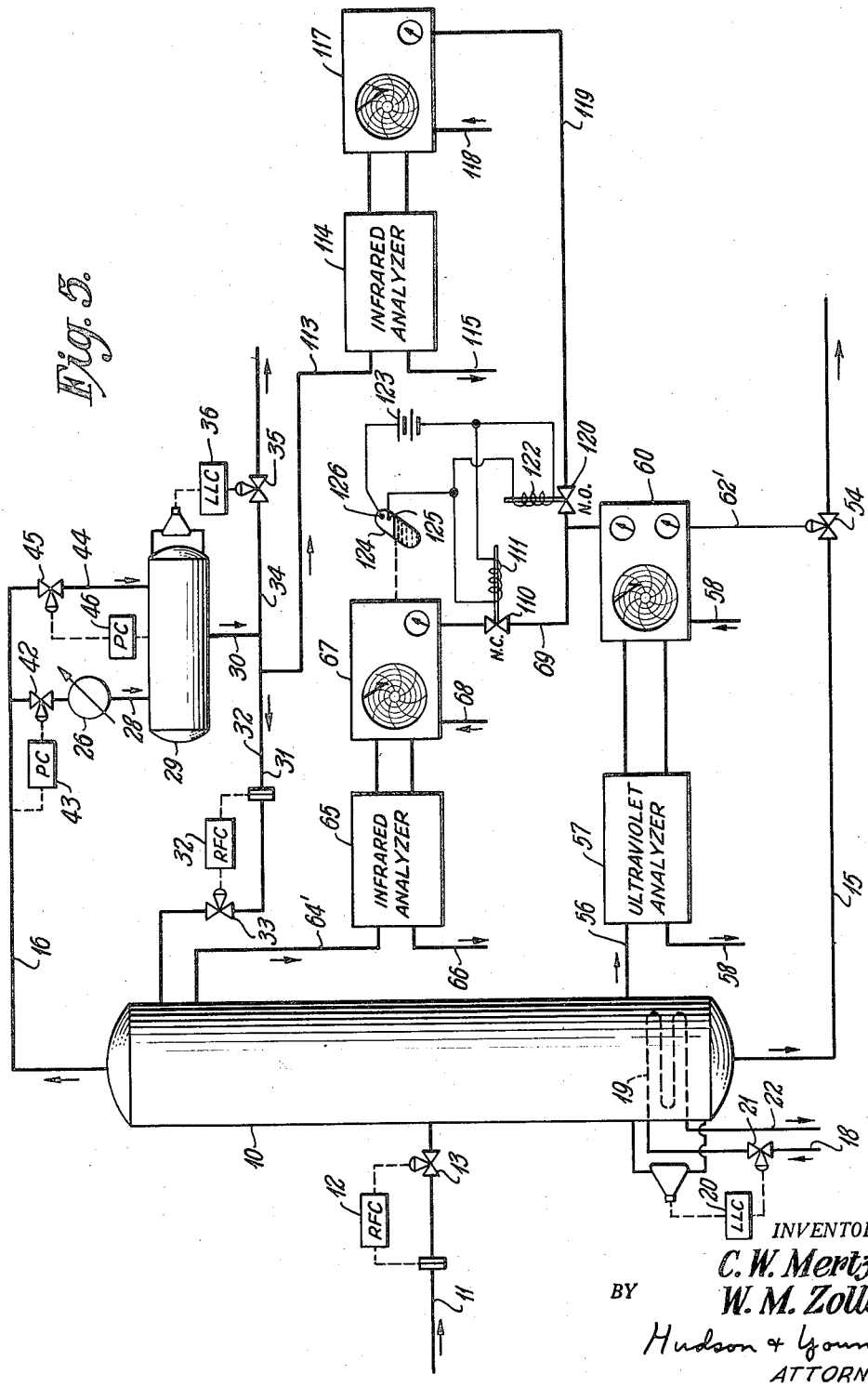

though not absolutely essential, it is preferred that some methyl acetylene be present in the feed stream in order to increase the acetylene concentration in the region where the second sample is withdrawn so that a more sensitive analysis can be made.

2,893,927
PROCESS CONTROL SYSTEM

Clyde W. Mertz, Bartlesville, Okla., and Willis M. Zoller, Borger, Tex., assignors to Phillips Petroleum Company, a corporation of Delaware Application July 15, 1954, Serial No. 443,544

1 Claim. (Cl. 202—160)

This invention relates to the separation of fluid mixtures into their several components. In another aspect it relates to a control system for fractionation columns. In another aspect it relates to a control system wherein the output signal from a first analyzer adjusts the output signal from a second analyzer. In still another aspect it relates to a method of and apparatus for controlling the separation of butadiene-1,3 from butene-2 (both high and low boiling isomers) in the presence of acetylenes whereby the concentration of acetylenes in the product butadiene stream is maintained within predetermined limits.

In recent years the production of butadiene has become increasingly important because of its use in the manufacture of synthetic rubber. In order to obtain butadiene having the necessary purity required for successful polymerization, means must be provided for separating butadiene from other hydrocarbons normally formed along with the butadiene by the cracking or dehydrogenation of selected hydrocarbons. Under present synthetic rubber manufacturing conditions it is required that the butadiene purity be not less than approximately 98 mol percent and further that not more than approximately 0.1 weight percent total acetylenes be present therein. One particular process which has been found to be valuable in accomplishing this separation is described in United States Patent 2,415,006. In the system therein described, the last step of the separation is one of fractional distillation of a feed stream containing butadiene, butene-2 and acetylenes into an overhead butadiene product stream and a butene-2, acetylenes bottoms stream.

The problem of separating butadiene from the butenes-2 and acetylenes by fractional distillation to a purity of not less than 98 mol percent and containing not more than 0.1 weight percent of total acetylenes has a number of peculiar aspects. Disregarding the acetylenes, the problem is essentially one of separating butadiene from the butenes-2, in particular the trans (low boiling) isomer, even though small amounts of butene-1, isobutylene and normal butane may be present in the feed stream. Because these latter components have nearly the same volatility as butadiene under the separating conditions, they are essentially non-separable from butadiene and, accordingly, warrant no further consideration. Through the proper selection of the reflux-to-feed ratio and the number of trays in the fractionating column, the desired separation between butadiene and butene-2 can be obtained. This separation is accomplished by ordinary fractionation.

The acetylenes which normally appear in the butadiene fractionation column feed stream are methyl acetylene, vinyl acetylene and ethyl acetylene. Methyl acetylene is a more volatile component than butadiene and for the most part is removed by the separation process described in Patent 2,415,006 prior to the feed stream entry into the last fractionation column. However, some methyl acetylene normally is present in the feed stream supplied to this last fractionation column and as such appears in the butadiene specification product. If it is assumed that the methyl acetylene content is approximately 0.02 weight percent, then there is allowed a maximum of 0.08 weight percent total of vinyl and ethyl acetylenes. Vinyl and ethyl acetylenes are less volatile than butadiene, but in the presence of butadiene and the butenes under distillation conditions, these acetylenes act in a non-ideal fashion, that is, their volatility relative to butadiene is not constant but is some complex function of composition. This leads to a peculiar distillation action within the column which results in the concentration gradient of the total acetylenes exhibiting a maximum concentration in the lower region of the column. The maximum concentration reached and the physical location of this maximum are functions of the acetylene concentration in the feed stream and the specification butadiene product purity. It has been found in operation that as the purity of the butadiene product is increased, the location of the acetylene concentration maximum is lowered and the concentration thereof is decreased. Thus, when difficulty is encountered in meeting the acetylene specification at 98.0% butadiene, the acetylene content specification can be met if the butadiene purity is increased, for example, to 98.5%. The control system of the present invention is adapted to provide a butadiene product stream of the required purity at minimum operating expense.

The control system of this invention is particularly adapted for use in conjunction with a fractionation column wherein the input feed to be separated contains butadiene, butene-2 and acetylenes. The overhead product stream contains a major portion of butadiene and the kettle product contains a major portion of butene-2. The kettle product stream is withdrawn at a constant rate which is maintained by a conventional rate-of-flow controller. A first sample stream is withdrawn from the lower portion of the column and analyzed to detect the presence of butadiene. The output signal of this analyzer overrides the rate-of-flow controller within predetermined limits so that the rate of withdrawal of the kettle product is adjusted to keep the butadiene concentration at the sample point substantially constant. A second sample stream is withdrawn from either an intermediate or upper portion of the column and analyzed to detect the presence of acetylenes. The output signal of the second analyzer in turn overrides the output of the first analyzer so that the measured concentration of acetylenes remains within predetermined limits and the overhead butadiene product stream does not contain excessive amounts of acetylene. In a second embodiment of this invention a third analyzer measures the concentration of butenes in the overhead product stream. This analyzer can be employed in place of the second analyzer to override the first analyzer so that the overhead product stream contains butadiene of the required purity.

Accordingly, it is an object of this invention to provide improved means for controlling the separation of butadiene from butene-2 and acetylenes.

Another object is to provide control apparatus for maintaining steady state operating conditions in a fractionation column.

Another object is to provide an automatic control system wherein the output signal of a first analyzer overrides the output signal from a second analyzer.

A further object is to provide a control system for regulating a fractionation column wherein butadiene is separated from butene-2 in the presence of acetylenes.

Various other objects, advantages and features of this invention should become apparent from the following detailed description taken in conjunction with the accompanying drawing in which:

Figure 5 is a schematic view of a second embodiment of the control system of this invention.

Figure 1:
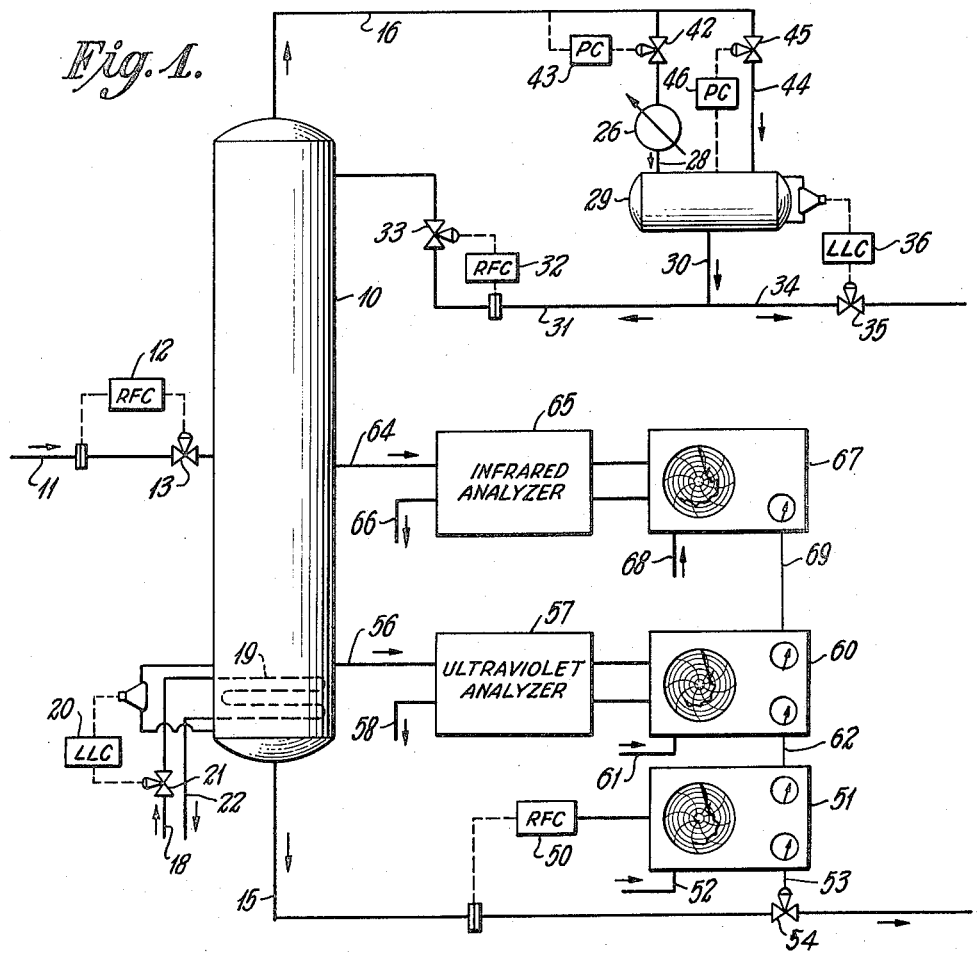
Figure 1 is a schematic view of a fractionation column including the analysis and control apparatus of this invention.

Referring now to the drawing in detail and to Figure 1 in particular, there is shown a fractionation column 10 of any suitable design employing contacting means such as perforated plates, bubble decks or the like. The feed mixture to be separated is supplied to column 10 through a line 11 at a rate controlled by a conventional rate-of-flow controller 12 which adjusts a valve 13 in line 11. The feed mixture is separated within column 10 into a liquid kettle product which is withdrawn through a line 15 and a lower boiling overhead gaseous stream which is withdrawn through a line 16. Heat is supplied to the lower portion of column 10 through a steam line 18 which communicates with coils 19 disposed in the lower portion of column 10. The rate of addition of steam to coil 19 is controlled by a liquid level controller 20 which adjusts a valve 21 in line 18 in response to the liquid level in the lower portion of column 10. The spent steam is removed through a line 22.

The gases which comprise the relatively light components of the feed mixture that are not retained in the heavier reboiled bottoms fraction are directed from the upper portion of column 10 through line 16 to a condenser 26 wherein they are partially or completely condensed, as desired, and wherefrom the resulting condensate is directed through a line 28 to a reflux accumulator 29. The distillate collected in accumulator 29 is discharged through a line 30. A portion of this distillate is directed through a line 31 back into the upper portion of column 10 as reflux. A constant flow rate is maintained in line 31 by a rate-of-flow controller 32 which adjusts a valve 33 in line 31. The remainder of the distillate removed from accumulator 29 is directed through an overhead product line 34 at a rate which is proportional to the liquid level in accumulator 29. A valve 35 in line 34 is controlled by a liquid level controller 36 which is attached to accumulator 29. In order to maintain the desired operating pressure in column 10, a valve 42 is disposed in line 16 upstream from condenser 26. Valve 42 is adjusted by a pressure controller 43 which is actuated by the pressure in line 16. A line 44 is connected between accumulator 29 and line 16 upstream from valve 42. A valve 45 in line 44 is adjusted by a pressure controller 46 in response to the pressure in accumulator 29.

Figure 2:
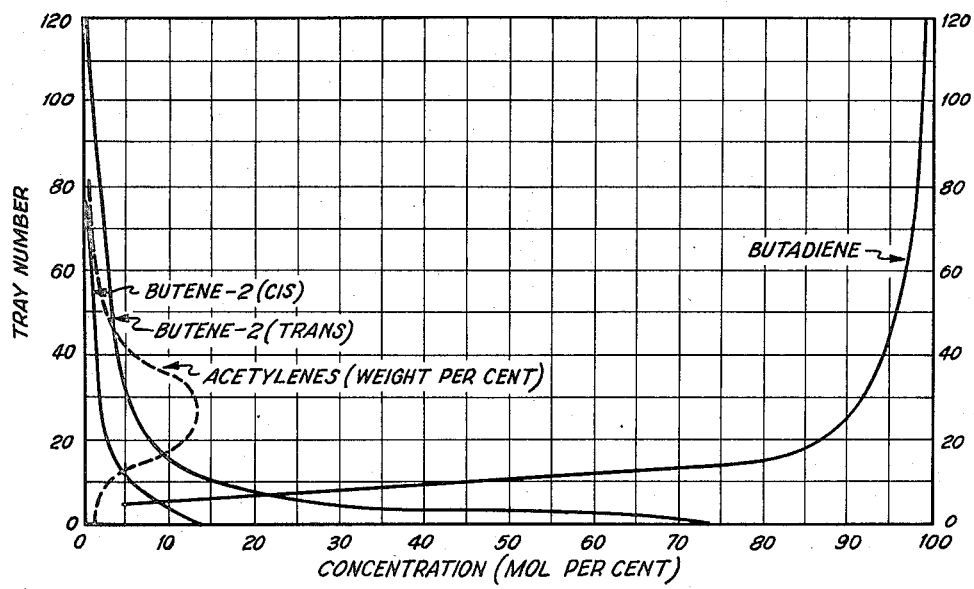
Figure 2 represents the concentrations of the components being separated within the fractionation column.

For purposes of description, reference is made to a particular separation wherein the principal components are present in column 10 in concentrations approximately as illustrated in Figure 2. Minor amounts of other hydrocarbons may also be present, but are not important in explaining this invention. The illustrated mol percents of butadiene and the butenes were obtained from samples having the acetylenes scrubbed therefrom. The dotted curve illustrates the concentration of acetylenes in terms of weight percent. The feed stream is separated in a column having 120 trays. This feed stream is admitted at approximately the sixty-sixth tray, counting from the bottom. The feed is admitted at a rate of approximately 3,400 gallons per hour, the reflux rate is approximately 33,900 gallons per hour, the overhead product is approximately 3,230 gallons per hour, and the kettle product is approximately 170 gallons per hour. The bottom of the column is maintained at approximately 147° F. and the top of the column at approximately 124° F. The pressure on the top of the column is approximately 70 pounds per square inch gage.

In accordance with the present invention, the withdrawal of kettle product through line 15 is regulated by a rate-of-flow controller 50 which actuates a pneumatic reset recorder-controller 51. A source of fluid pressure, which can be air at approximately 20 pounds per square inch gage pressure, is supplied to controller 51 through an inlet line 52. The air pressure in an outlet line 53 from controller 51 is adjusted in accordance with the output signal from controller 50 which is representative of the flow rate in line 15. The air pressure in line 53 adjusts a pneumatic operated valve 54 in line 15.

A first sample stream is withdrawn from an intermediate region of column 10 through a line 56. The sample stream removed through line 56 is passed to an ultraviolet analyzer 57 and is vented through a line 58. The output signal from analyzer 57 is applied to a pneumatic reset recorder-controller 60 which is supplied with a source of input air through a line 61. Controller 60 provides a regulated output air pressure in a line 62. This pressure is proportional to the signal from analyzer 57. The output pressure in line 62 is applied to controller 51 to adjust the set point thereof. A second sample stream is removed from column 10 through a line 64 which communicates with column 10 at a higher intermediate region therein. The second sample stream is passed through an infrared analyzer 65 and is vented through a line 66. The output signal from analyzer 65 is applied to a recorder-controller 67. Input air is supplied to controller 67 through a line 68 and the regulated output air from controller 67 is applied through a line 69 to controller 60 to adjust the set point thereof.

Rate-of-flow controller 50 is adapted to provide an output signal representative of the flow rate through conduit 15. For example, controller 50 can be a conventional instrument which provides a signal, either electrical or mechanical, that is representative of the pressure differential across an orifice in conduit 15. This output signal from controller 50 regulates the output pressure in line 53 from controller 51 to provide a pneumatic pressure representative of the flow rate through conduit 15. Controller 51 can be any commercially available instrument such as the pneumatic reset recorder-controller of the Brown Instrument Company.

Figure 3:
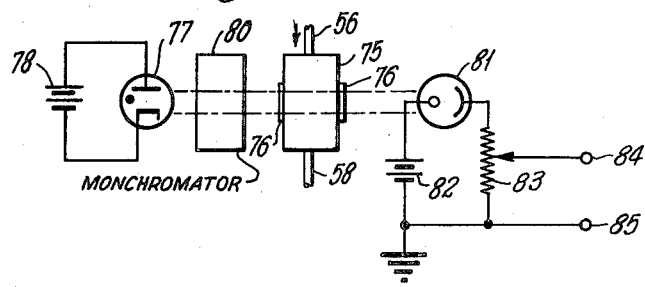
Figure 3 is a schematic representation of an ultraviolet analyzer employed in this invention.

Analyzer 57 is illustrated schematically in Figure 3. The sample stream removed through conduit 56 is directed through a sample cell 75 and is vented through conduit 58. Cell 75 is provided with windows 76 which are transparent to the ultraviolet radiation directed therethrough. This radiation is provided by a hydrogen discharge lamp 77 which has a source of voltage 78 connected thereacross. Radiation emitted from lamp 77 is directed through a monochromator 80 which limits the transmitted radiation to a selected wave length band which can be in the range of 200 to 245 millimicrons. The radiation transmitted through monochromator 80 passes through sample cell 75 and impinges upon a photoelectric cell 81. The cathode of cell 81 is connected to the negative terminal of a battery 82 through a potentiometer 83. The anode of cell 81 is connected to the positive terminal of battery 82. A first output terminal 84 is connected to the contactor of potentiometer 83 and a second output terminal 85 is connected to the second end of potentiometer 83, which can be maintained at ground potential. The radiation transmitted through cell 75 is a function of the butadiene and acetylenes present in the sample stream circulated through cell 75 since these components have absorption bands in the selected ultraviolet region. The output electrical signal between terminals 84 and 85 is, therefore, a function of the current flow through tube 81 which, in turn, is a function of the radiation impinging upon the cathode thereof. The output signal between terminals 84 and 85 is applied to controller 60 so that the output air pressure in conduit 62 is a function of this electrical signal. Analyzer 57 is illustrated in a rather schematic manner. This analyzer can be of the form described in the copending application of H. M. Barton, Jr., Serial No. 401,358, filed December 30, 1953, or can be a commercially available instrument. As described in the Barton application, the output signal between terminals 84 and 85 can be amplified before being applied to controller 60. The output circuitry of analyzer 57 can be adjusted such that the air pressure in conduit 62 either increases or decreases with an increase in voltage between terminals 84 and 85. The output air pressure from controller 60 is applied through conduit 62 to controller 51 to adjust the index point thereon.

Figure 4:
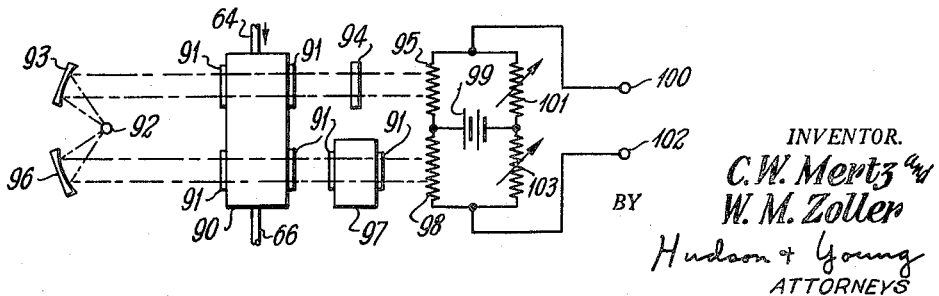
Figure 4 is a schematic representation of an infrared analyzer employed in this invention.

Analyzer 65 is illustrated in detail in Figure 4. The sample stream removed through conduit 64 is passed through a sample cell 90 and is vented through conduit 66. Cell 90 is provided with two pairs of opposing windows 91, such as quartz, which are transparent to the infrared radiation directed therethrough. This radiation is provided by an element 92 which can be a coil of heated wire. A first beam of radiation emitted from element 92 is reflected from a mirror 93 through sample cell 90 and a filter plate 94 to impinge upon a first radiation sensitive electrical resistance element 95. A second beam of radiation from element 92 is reflected from a mirror 96 through cell 90 and a filter cell 97 to impinge upon a second radiation sensitive electrical resistance element 98. Filter cell 97 is also provided with transparent windows 91. Analyzer 65 is adapted to detect the presence of acetylenes. Filter cell 97 is filled with a sample of acetylenes at atmospheric pressure. Methyl acetylene, ethyl acetylene and vinyl acetylene have radiation absorption characteristics which approximate one another. One or a mixture of these acetylenes can be used in cell 97. Filter plate 94 is constructed of the same material as windows 91 and is provided to compensate for the radiation absorbed by these windows in cell 97. Resistance elements 95 and 98 are connected in adjacent arms of a Wheatstone bridge circuit. The junction between elements 95 and 98 is connected to one terminal of a voltage source 99. The second terminal of resistance element 95 is connected to an output terminal 100 and to the first terminal of a variable resistor 101. The second terminal of resistance element 98 is connected to a second output terminal 102 and to the first end terminal of a variable resistor 103. The second end terminals of resistors 101 and 103 are connected to one another and to the second terminal of voltage source 99.

In the absence of acetylenes in the sample stream circulated through analyzer 65, the radiation received by element 98 is less than the radiation received by element 95 because of the absorption by the acetylenes in cell 97. However, as the acetylene concentration in sample cell 90 increases, the radiation received by elements 95 and 98 becomes more nearly the same. The radiation received by element 98 does not change appreciably because that portion of the radiation which is absorbed by acetylenes was previously absorbed by cell 97. The radiation received by element 95 decreases, however, because of the absorption by acetylenes in cell 90. The magnitude of the voltage appearing between terminals 100 and 102 is, therefore, a function of the acetylenes' content of the sample stream removed from column 10 through sample line 64.

Analyzer 65 can be of the form shown in U.S. Patent 2,579,825. The output signal from analyzer 65 is applied to controller 67 so that the air pressure in conduit 69 is a function of the acetylenes present in the sample stream removed through conduit 64. Controller 67 is substantially the same as controllers 51 and 60 except that the pneumatic reset is not provided.

From an inspection of the curves in Figure 2 it can be seen that the overhead product stream removed from column 10 contains a major amount of butadiene whereas the kettle product stream contains a major amount of a mixture of butene-2 and acetylenes. As previously discussed, it is desired that the column be operated so that the overhead product stream is of purity not less than approximately 98 mol percent butadiene and contains not more than 0.1 weight percent total acetylenes. While a butadiene purity of greater than 98 percent is not objectionable, it results in uneconomical operation. The feed stream to be separated is passed into column 10 at a constant flow rate which is maintained by rate-of-flow controller 12. Heat is supplied to the lower portion of column 10 through steam line 18 at a rate determined by controller 20 such that the liquid level in column 10 is maintained at a predetermined level. The overhead vapors removed through conduit 16 are passed to accumulator 29 through conduit 44 or condenser 26 in amounts regulated by pressure controllers 43 and 46 to maintain a constant pressure on the top of column 10. The overhead product withdrawal rate is adjusted in response to the liquid level in accumulator 29, while the reflux is returned to the column at a constant rate which is maintained by rate-of-flow controller 32. The controls thus far described are adjusted initially so that the column operates to provide, generally, the desired separation. The kettle product withdrawal rate through conduit 15 is adjusted in accordance with the present invention in response to one or more analyses of sample streams removed from the column.

In the system illustrated in Figure 1, the flow rate through conduit 15 normally is maintained constant by rate-of-flow controller 50 which adjusts the air pressure applied to valve 54. For purposes of description it will be assumed that an increase in air pressure tends to open the valve and that a decrease in air pressure tends to close the valve. The sample stream removed from column 10 through line 56 is analyzed by instrument 57 to determine the concentration of butadiene plus acetylenes within column 10 at the region of sample line 56. This analysis is referred to as an analysis for the "apparent" butadiene because the ultraviolet analyzer is not capable of distinguishing between the butadiene and acetylenes. However, the acetylenes have been found to be correlated with the butadiene and thus can be regarded as a constant in the sample stream. If the apparent butadiene in the sample stream removed through line 56 should tend to increase, then valve 54 is closed further to reduce the rate of withdrawal of kettle product. This in turn results in a greater overhead product withdrawal rate which is permissible within the 98 percent specification. In order for the output signal from analyzer 57 to close valve 54, controller 51 must be set for a lower flow rate. This is accomplished by the pneumatic reset mechanism in controller 51 which is energized by the air pressure in conduit 62. If controller 51 is set for a lower flow rate, then valve 54 is closed further. Conversely, if the apparent butadiene in line 56 decreases, valve 54 is opened further to increase the withdrawal of kettle product, thereby increasing the purity of the overhead butadiene product because more butenes and acetylenes are withdrawn through line 15.

The system thus far described affords complete control as long as the acetylene concentration in the sample removed through line 64 does not exceed predetermined limits. As long as this acetylene concentration is less than a predetermined value, analyzer 65 and controller 67 exert no influence on the control system. However, if the detected acetylene concentration at analyzer 65 should tend to increase beyond the predetermined limit, it is important that valve 54 be opened to a greater extent to remove more acetylenes through the kettle product stream. If the acetylenes concentration exceeds this predetermined limit, the output air pressure in conduit 69 is applied to the reset mechanism of controller 60 so that controller 60 is set for a lower apparent butadiene concentration. Since the actual measured butadiene concentration is then higher than this set point, the output air pressure in conduit 62 resets controller 51 so that valve 54 is opened as required. Once the acetylene concentration in sample line 64 falls below the predetermined limit, controller 60 is restored to its initial set point and the override influence of analyzer 65 is discontinued. Sample line 56 communicates with a lower region of column 10, such as tray number 5, while sample line 64 communicates with an intermediate region, such as tray number 44. Tray 44 is chosen because the acetylenes' concentration changes rather rapidly from tray to tray at that portion of the column.

In Figure 5 there is shown a second embodiment of the control system of this invention. The input feed stream, the heat supplied to the column and the overhead conduit system are regulated by controls identical to those illustrated in Figure 1. Corresponding elements are indicated by like reference numerals. In the control system of Figure 5, the output air line 62' of controller 60 is connected directly to valve 54 rather than through a controller such as 51. Controller 60 operates in substantially the same manner as described in conjunction with Figure 1 except that the rate-of-flow controller 50 is eliminated. Either system is satisfactory. The reason for employing a rate-of-flow controller 50 and controller 51 is to provide a safety factor. Controller 51 can be adjusted within set limits such that the rate of flow through conduit 15 is maintained between these limits irrespective of the signal applied to controller 51 by line 62. If the override control instruments should fail to operate properly, the column cannot be thrown badly out of control because of the limits maintained by controller 51. However, it has been found that the analyzers of this invention are sufficiently reliable to enable rate-of-flow controller 50 to be eliminated. Obviously, this controller can be eliminated from Figure 1 if desired.

The input sample line 64' of acetylenes analyzer 65 is connected to an upper portion of column 10 rather than to the intermediate portion indicated in Figure 1. In this manner the concentration of acetylenes at a point nearer the overhead product stream is obtained. Sample line 64' can communicate with either overhead product line 34 or reflux line 32 if desired. The output air pressure from controller 67 is applied by line 69 to the reset mechanism of controller 60. However, line 69 contains a normally closed valve 110 which is actuated by a solenoid 111.

A second override infrared analyzer 114 is provided in the control system of Figure 5. A third sample stream is withdrawn from either the reflux line 32 or the overhead product line 34 through a line 113 which is connected to the inlet of analyzer 114. The sample stream is vented through a line 115. The output signal from analyzer 114 is applied to a pneumatic recorder-controller 117. Controller 117 is supplied with air under pressure through a line 118. The regulated output air pressure from controller 117 is applied by a line 119 to the reset mechanism of controller 60. Line 119 contains a normally open valve 120 which is actuated by a solenoid 122. First terminals of solenoids 111 and 122 are connected to the first terminal of a voltage source 123. The second terminal of voltage source 123 is connected to a first contact 126 of a mercury switch 124. The second terminals of solenoids 111 and 122 are connected to the second terminal 125 of switch 124. Switch 124 is mechanically coupled to controller 67 in a manner such that contacts 125 and 126 normally are not connected. However, when the concentration of acetylenes removed from column 10 through line 64' exceeds a predetermined value, switch 124 is tipped such that the mercury therein completes electrical contact between terminals 125 and 126.

Analyzer 114 is substantially the same as the analyzer 65 illustrated in Figure 4. However, analyzer 114 is employed to indicate the concentration of butenes. To this end, filter cell 97 of Figure 4 is filled with either of the butenes or with a mixture of the two. In this manner the output electrical signal from analyzer 114 is indicative of the concentration of butenes in the overhead product stream.

In normal operation of the column, analyzer 57 provides the basic control by regulating valve 54 in the manner previously described in conjunction with Figure 1. The basic control sample point must be connected near the variable to be regulated, line 15, to avoid time lags between the sample point and the subsequent control. Controller 117 is adjusted to tend to maintain a maximum permissible content of butenes in the overhead product stream so that the column is operated in as economical a manner as possible. For example, controller 117 can be set to maintain approximately 1.5 percent butenes in the overhead product stream. If the indicated concentration of butenes should tend to fall below this value, valve 54 is closed to reduce the quantity of butenes removed through line 15. This is accomplished by the air pressure in line 119 resetting controller 60 in the manner previously described. Conversely if the indicated concentration of butenes should tend to exceed the set value, it is necessary to open valve 54 further to increase the rate of withdrawal of butenes through line 15. Both these adjustments are accomplished by controller 117 resetting controller 60.

If the concentration of acetylenes in the sample stream removed from line 64' tends to increase above the permissible value, switch 124 is tripped by controller 67. This energizes solenoids 111 and 122 such that valve 110 is opened and valve 120 is closed. Controller 117 is thereby removed from controller 60 and controller 67 is connected in place thereof. Controller 67 then resets controller 60 in exactly the same manner as previously described in conjunction with Figure 1. When the concentration of acetylenes in sample line 64' falls below the preselected limit so that switch 124 is returned to its initial position to deenergize solenoids 111 and 122. The override control is then restored to controller 117.

Figure 6:
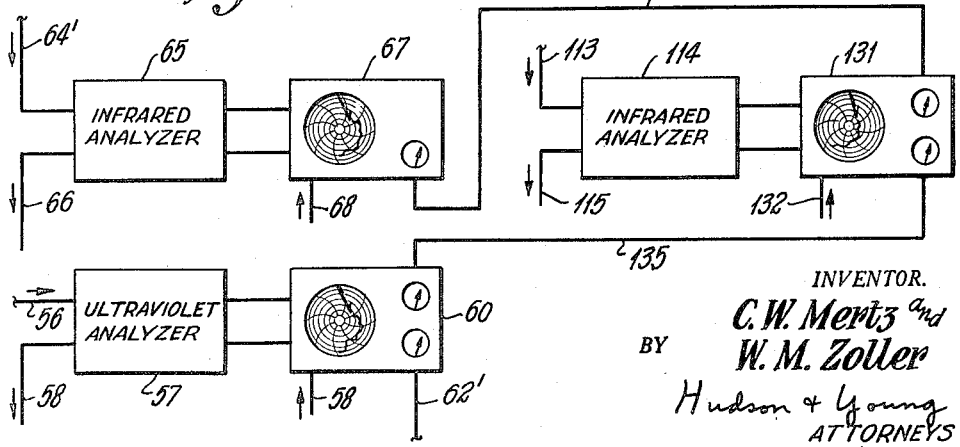
Figure 6 is a schematic view of a third embodiment of the control system of this invention.

In Figure 6 there is shown a third embodiment of the control system of this invention. Analyzers 57, 65 and 114 are connected to the column in exactly the same manner as shown in Figure 5. Controller 117 of Figure 5 is replaced by a pneumatic reset controller 131 which is supplied with air by a line 132. The output regulated air from controller 131 is applied to the reset mechanism of controller 60 through a line 135. The output regulated air from controller 67 is applied to the reset mechanism of controller 131 through a line 130. In normal operation, controller 131 resets controller 60 in response to the determination of butenes in the overhead product stream in the manner described in conjunction with Figure 5. As long as the acetylenes concentration in the sample removed through line 64' remains less than the predetermined value, controller 67 exerts no influence at all over controller 131 because there is no output signal to the reset mechanism of controller 131. When the acetylene concentration of the material in line 64' is the same as or exceeds the predetermined value set on controller 67, there is an output signal from the controller to the reset mechanism of controller 131. The reset mechanism of controller 131 is driven downward from the upper set limit corresponding to 1.5 percent butenes to a new set limit corresponding to a butenes value in the range of 0–1.5 percent. This lower set value on the butenes analyzer results in more flow through valve 54 until the acetylenes concentration of the material in line 64' is again lower than the predetermined value set on controller 67. At this time the reset mechanism of controller 131 is returned automatically to the upper set limit corresponding to 1.5 percent butenes.

From the foregoing description it can be seen that there is provided in accordance with this invention an improved process control system employing two or more separate analyzers that are connected so that the basic controller is reset as dictated by the auxiliary controls. In this manner a feed stream containing butadiene, butene-2 and acetylenes can be separated in a manner to provide a first product stream containing butadiene of a desired concentration. While this invention has been described in conjunction with present preferred embodiments it should be apparent that the invention is not limited thereto.

What is claimed is:

In a system to separate a fluid mixture comprising butadiene, butene-2, vinyl acetylene and ethyl acetylene into a first product stream comprising a major percent of butadiene and a second product stream comprising a major percent of butene-2; separating apparatus comprising, in combination, a fractionation column, an inlet line communicating with said column to supply such a fluid mixture to be separated, means to supply heat to the lower portion of said column, first conduit means communicating with the upper portion of said column to remove such a first product stream, means to return a portion of the fluid removed through said first conduit means to said column as reflux, second conduit means communicating with the lower portion of said column to remove such a second product stream, a first sample line communicating with a first region in said column, first analysis means to analyze fluid removed from said column through said first sample line to determine the concentration of butadiene therein, first control means to control the rate of fluid flow through said second conduit means responsive to said first analysis means to tend to maintain the concentration of butadiene in said first sample line constant by decreasing the rate of fluid flow through said second conduit means if the measured butadiene concentration exceeds a predetermined value and by increasing the rate of fluid flow through said second conduit means if the measured butadiene concentration becomes less than a predetermined value, a second sample line communicating with a second region in said column, second analysis means to analyze fluid removed from said column through said second sample line to determine the concentration of butene-2 therein, means responsive to said second analysis means to reset said first control means to control the rate of fluid flow through said second conduit means to maintain the concentration of butene-2 within preselected limits in said second sample line by increasing the rate of fluid flow through said second conduit means if the measured concentration of butene-2 exceeds a predetermined value and by decreasing the rate of fluid flow through said second conduit means if the measured concentration of butene-2 becomes less than a predetermined value, a third sample line communicating with a third region in said column, third analysis means to analyze fluid removed from said column through said third sample line to determine the concentration of acetylenes therein, and third control means responsive to said third analysis means to disconnect said second control means from said first control means and to reset said first control means responsive to said third analysis means to maintain the concentration of acetylenes within preselected limits in said third sample line by increasing the rate of fluid flow through said second conduit means if the measured concentration of acetylenes exceeds a predetermined value and by decreasing the rate of fluid flow through said second conduit means if the measured concentration of acetylenes becomes less than a predetermined value.

References Cited in the file of this patent

UNITED STATES PATENTS

| | | |
|---|---|---|
| 2,246,934 | Denney | June 24, 1941 |
| 2,415,006 | Hachmuth | Jan. 28, 1947 |
| 2,459,404 | Anderson | Jan. 18, 1949 |
| 2,647,863 | Kochie | Aug. 4, 1953 |
| 2,684,326 | Boyd | July 20, 1954 |
| 2,696,464 | Mathis et al. | Dec. 7, 1954 |
| 2,709,678 | Berger | May 31, 1955 |
| 2,764,536 | Hutchins | Sept. 25, 1956 |
| 2,795,537 | Kemp et al. | June 11, 1957 |
| 2,816,858 | Walker | Dec. 17, 1957 |